United States Patent
Anderson

(12) 
(10) Patent No.: US 6,451,370 B1
(45) Date of Patent: Sep. 17, 2002

(54) COMPLETE ANIMAL FEED WITH POTATO COMPONENT

(76) Inventor: Tom Anderson, P.O. Box 1304, Pocatello, ID (US) 83204

(*) Notice: Subject to any disclaimer, the term of this patent is extended or adjusted under 35 U.S.C. 154(b) by 0 days.

(21) Appl. No.: 09/579,021

(22) Filed: May 25, 2000

(51) Int. Cl.$^7$ ................................................. A23K 1/14

(52) U.S. Cl. ........................ 426/635; 426/648; 426/656; 426/661

(58) Field of Search ................................. 426/635, 648, 426/656, 661

(56) References Cited

U.S. PATENT DOCUMENTS

| | | | |
|---|---|---|---|
| 3,420,671 A | * 1/1969 | Hess et al. | 99/2 |
| 3,881,024 A | * 4/1975 | Pahoundis, Sr. et al. | 426/578 |
| 4,144,355 A | * 3/1979 | Rawlings et al. | 426/2 |
| 4,584,024 A | * 4/1986 | Hisada et al. | 127/66 |
| 5,051,270 A | 9/1991 | Ueda et al. | 426/574 |
| 5,354,818 A | 10/1994 | Vazza | 426/53 |

FOREIGN PATENT DOCUMENTS

EP  169106  * 1/1986

OTHER PUBLICATIONS

Chemical Marketing Reperter, p. 7., Aug. 24, 1981.*
Food Processing (London) p. 65, Mar. 1995.*
Mayer Et Al., Applied Microbiol. & Biotechnol., vol. 48(4), p. 435–440., Oct. 1997.*
Dickey Et Al., Maine, Life Sci Agir Exp Stn., Bull. vol. 711, p. 23, 1974.*
Feedstuffs, p. 7, Aug. 30, 1993.*
Pluzhnikov, Konevodstvo; Kouny; Sport, No. 11, p. 31, 1983.*
Sobczak, Zeszyty Naukoise Akademir, No. 125, p. 89–98, 1980.*

* cited by examiner

Primary Examiner—Chhaya D. Sayala
(74) Attorney, Agent, or Firm—Pedersen & Company, PLLC; Ken J. Pedersen; Barbara S. Pedersen

(57) ABSTRACT

A complete integral pelletized animal feed which is easily and economically prepared with a potato component. This invention combines hay, oats, and potato waste with a vitamin supplement premix. The potato component acts as a binder which makes it possible to pelletize the combined components. The composite animal feed is a complete food requiring no further supplementation. The instant invention provides an economical, one-step, integral, composite animal feed which incorporates potato waste and a vitamin supplement premix forming a complete animal feed. The instant invention is economically produced using potato waste, and economical to use since no further supplementation is necessary.

10 Claims, No Drawings

COMPLETE ANIMAL FEED WITH POTATO COMPONENT

BACKGROUND OF THE INVENTION

1. Field of the Invention

This invention relates generally to food for animals. More specifically, this invention relates to a complete, integral animal feed, especially for horses, cattle, dogs, cats and other domesticated animals. The complete animal feed includes a potato component which acts as a binder to bind all of the components of the feed into an integral, pelletizable product. The potato component is particularly useful for binding a nutritional supplement with the other components. The nutritional supplement will vary depending upon the animal in question. All of the components, including the bound nutritional supplement, are combined and pelletized. The resulting pellets provide an integral animal feed which alone meets the complete nutritional requirements of the particular animal.

2. Related Art

For a long time, ranchers and cattle feed-lot operators have fed cows with feed with a potato component. Typically, the potato component is a by-product from potato processing for food for humans. For example, potato peels, off-size bits and chunks, and off-spec potato flakes or granules, french fries and hash browns have often been recovered and used for cattle feed.

Typically, however, the potato component in cattle feed has been just a portion of the cow's diet. Supplemental roughage and nutrients from hay and grain have also been required. These supplemental components have been supplied separately to the ranch pens and commercial feedlots where they have been typically mixed with the potato component and distributed to the cattle feed bunks and troughs.

U.S. Pat. No. 5,051,270 (Ueda et al.) discloses a high protein food containing potato powder, the food product being prepared by forming a dough, and heating the dough in a vacuum until the dough is dried to a water content of about 3 weight percent. It is critical that the product be heated at reduced pressure to obtain the desired water content without heating the dough itself excessively, permitting the proteins to be thermally denatured and thereby give an improved flavor without becoming thermally degraded. The process of Ill produces a food which does not feel powdery, but tastes more like snack foods.

U.S. Pat. No. 5,354,818 (Vazza) discloses a livestock feed from potato waste which is treated with a starch hydrolyzing enzyme and three types of yeasts. The starch hydrolyzing enzyme aids in the conversion of the starch present in the potato waste to sugars which the fermenting yeasts utilize during their growth. The particular combination and order of addition of yeasts and enzymes insures that virtually all carbohydrate present in the potato waste is used to support the growth of the yeasts producing a high protein, low carbohydrate livestock feed.

Still, there is a need for a complete integral animal feed which is easily and economically prepared with a potato component. This invention addresses that need by combining hay, oats, and potato waste with a vitamin supplement premix. The composite animal feed is a complete food requiring no further supplementation. The instant invention provides an economical, one-step, integral, composite animal feed which incorporates potato waste and a vitamin supplement premix forming a complete animal feed. The instant invention is economically produced using potato waste, and economical to use since no further supplementation is necessary.

SUMMARY OF THE INVENTION

The invention is an animal feed containing a potato component, and a method of producing an animal feed containing a potato component. Preferably, the potato component is a dehydrated potato flake component which is a by-product of potato flake manufacture for human consumption, and contains only about 10 weight percent water. In addition, when used as a horse feed, the composite also contains chopped or ground hay, ground oats and a soy-meal based supplement containing a yeast culture, vitamins, minerals and 50 weight percent soy-meal. The relative weight percent of each of the components is about:

| |
|---|
| 40 wt % - hay |
| 20 wt % - oats |
| 35 wt % - potato flakes |
| 5 wt % - soy-meal supplement |
| Total - 100% |

All of these components are mixed together and the mixture is then pelletized to create individual, integral briquettes, sized about 1 cubic inch and bagged in 50 lb. packages for a complete horse feed.

When the feed is used for other animals, the relative weight percentages of the components, the components themselves, and the composition of the supplement may vary. However, in all instances, the potato component acts as the binder. The binder makes it possible to produce an integral pelletized food, including a nutritional supplement, which meets all of the nutritional requirements of the particular animal in question.

DESCRIPTION OF THE PREFERRED EMBODIMENTS

The invention is a simple, complete animal feed containing a potato component, hay, and oats, with a vitamin supplement premix; and a method of producing said animal feed. Preferably, the potato component is processed from potato waste from potato processing plants producing potato flakes, granules, french fries, potato chips and the like. More preferably, the potato component is a dehydrated potato flake component which is a by-product of potato flake manufacture for human consumption, and contains only about 10 weight percent water, or less.

When used as a horse feed, for example, along with the potato component, the composite also contains the following components: chopped or ground hay, ground oats, and a nutritional supplement. The hay is preferably ground alfalfa, although timothy, clover or other dried grasses may be suitable. The alfalfa is used in an amount sufficient to make up about 40 weight percent of the final product. The ground oats make up about 20 weight percent of the final product. The nutritional supplement is preferably a soy-meal based supplement containing soybean meal, yeast culture, monodicalcium phosphate, wheat midds, calcium carbonate (about 5 wt. %), salt (about 5 wt. %), magnesium oxide, lysine, methionine, vitamin A acetate (25,000 IU/lb), vitamin $D_3$ supplement (10,000 IU/lb), vitamin E supplement (300 IU/lb), choline chloride, biotin, cobalt glucoheptonate, copper amino acid complex, copper sulfate, ethylene diamine dihydriodide (EDDI), iron carbonate, manganese amino acid complex, manganese sulfate, sodium selenite, zinc amino acid complex, zinc sulfate, mineral oil, and natural and artificial flavors.

The relative weight percent of each of the components in the preferred horse feed is about:

40 wt % - alfalfa
20 wt % - oats
35 wt % - potato flakes
5 wt % - soy-meal supplement Total - 100%

All of these components are mixed together and the mixture is then pelletized to create individual, integral briquettes, sized about 1 cubic inch and bagged in 50 lb. packages for a complete horse feed.

The pelletization process is carried out using the following four basic steps:

1. Double grinding. The primary grinder, a W. H. 0. tub grinder, accepts the various components in the proper weight percentages and completes the initial grind by forcing the components through a ½" screen by way of a rotary hammer mill. The product is then augered into a second hammer mill and forced through a ¼" screen. Pneumatics then lift the ground product into an overhead surge bin.

2. Making the pellet. In the second step, the ground product is augered from the surge bin directly into a pellet mill where steam is added in a mixing chamber to create a damp meal-like substance. This "meal" then enters a pellet chamber where metal rolls force the meal into holes in a pellet die. As the die fills, meal continues to be pushed into the holes until it is forced out the other side of the die, creating a pellet.

3. Cooling. In the cooling process, the hot pellet is dropped directly out of the mill into a cooling chamber. The pellets are in a continuous flow through the 8' cooling chamber where ambient air is forced over the pellets to extract any additional heat and moisture. Cooled pellets are then transferred from the cooling chamber to overhead storage bins by way of an elevator leg.

4. Load out. The final step is to load-out the finished product from overhead storage bins into trucks below using gravity flow.

The above delineated pelletizing process is the same process used for making the various types of animal feed contemplated by the instant invention. When the feed is used for dog or cat food, for instance, the potato component and the hay and oat components will remain about the same. However, in these instances, the soy-meal supplement component will change.

The particular components of each of the embodiments of the instant invention will vary depending upon the particular nutritional requirements of the animal in question. In each case, however, once the components are determined, the pelletization process is largely identical. The novel aspect of the instant invention is the inclusion of a potato component which acts as a binder allowing the formation of pelletized animal food containing all of the desired components.

It is known to use potato waste as food for animals. Potato waste from plants producing sweet potatoes, potato flakes, granules, french fries or potato chips, may include the waste slurry from steam or abrasive peelers, potato trimmings from inspection tables, improperly blanched potatoes, finished potatoes which are damaged due to dehydration, and undersized potatoes that do not meet processing standards. It has been found that potato waste slurry is not useful for producing the animal feed of the instant invention. In order to produce a composite product which is pelletizable, the potato component is processed from potato waste from potato processing plants producing potato flakes, granules, french fries, potato chips and the like. More preferably, the potato component is a dehydrated potato flake component which is a by-product of potato flake manufacture for human consumption, and contains only about 10 weight percent water, or less. It has been found that dehydrated potato flakes containing about 10 weight percent water, or less, allows for facile pelletization of the final composite material containing each of the desired components.

The starch from the potato component acts to bind all of the components of the final animal feed product into a pelletizable composite. It is believed that the process for producing potato flakes or granules for human consumption causes rupture of potato cells so that starch is released from the cells. The product resulting from said process is thereby well suited to act as a binder in the instant invention. It is also important to use dehydrated potato flakes or granules containing 10 weight percent water or less. It has been found that a higher water weight percentage prevents the formation of high quality pellets of the final composite material. While other potato waste products likely contain ruptured cells due to processing, the amount of available starch, is not of an amount sufficient to facilitate adequate binding to produce a final pelletizable product.

In compliance with the statute, the invention has been described above with reference to particular means, materials and embodiments. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A pelletized, complete animal feed made from potato waste comprising:

a chopped or ground hay and ground oats component;

a soy-meal based nutritional supplement; and a potato waste component comprising dehydrated potato flakes or granules containing less than or equal to about 10 weight percent water;

wherein said potato waste component acts as a binder to bind together said hay and oats component, nutritional supplement, and potato waste component into a pelletizable animal food.

2. The animal feed of claim 1 wherein:

said animal feed is a horse feed.

3. The animal feed of claim 1 wherein:

said hay and oats component comprises about 67 wt. % hay and about 33 wt. % oats.

4. The animal feed of claim 3 wherein:

said nutritional supplement comprises a yeast culture, vitamins, minerals and about 50 wt. % soy-meal.

5. The animal feed of claim 4 wherein:

said animal feed comprises about 40 wt. % hay, 20 wt. % oats, 35 wt. % potato waste component, and 5 wt. % nutritional supplement.

6. A method of making an animal feed from potato waste comprising:

providing:
- a chopped or ground hay and ground oats component;
- a soy-meal based nutritional supplement; and
- a potato waste component comprising dehydrated potato flakes or granules containing less than or equal to about 10 weight percent water;

combining said hay and oats component, said nutritional supplement, and said potato waste component in a grinder;

grinding said hay and oats component, said nutritional supplement, and said potato waste component in said grinder to form a ground product;

conveying said ground product into a mixing chamber;

adding steam to said ground product in said mixing chamber to form a meal;

conveying said meal to a pellet chamber where metal rolls force the meal into holes in a pellet die;

forcing the meal through the pellet die to form pellets; and allowing the pellets to cool.

7. The method of claim 6 wherein:

said animal feed is a horse feed.

8. The method of claim 7 wherein:

said hay and oats component comprises about 67 wt. % hay and about 33 wt. % oats.

9. The method of claim 8 wherein:

said nutritional supplement comprises a yeast culture, vitamins, minerals and about 50 wt. % soy-meal.

10. The method of claim 9 wherein:

said animal feed comprises about 40 wt. % hay, 20 wt. % oats, 35 wt. % potato waste, and 5 wt. % nutritional supplement.

* * * * *